US012347965B2

(12) United States Patent
Peña et al.

(10) Patent No.: US 12,347,965 B2
(45) Date of Patent: Jul. 1, 2025

(54) POWER TOOL BATTERY CHARGER

(71) Applicant: Milwaukee Electric Tool Corporation, Brookfield, WI (US)

(72) Inventors: Matthew J. Peña, Wauwatosa, WI (US); Hai Jun Li, Dongguan (CN)

(73) Assignee: Milwaukee Electric Tool Corporation, Brookfield, WI (US)

( * ) Notice: Subject to any disclaimer, the term of this patent is extended or adjusted under 35 U.S.C. 154(b) by 688 days.

(21) Appl. No.: 17/686,159

(22) Filed: Mar. 3, 2022

(65) Prior Publication Data

US 2022/0285956 A1 Sep. 8, 2022

Related U.S. Application Data

(63) Continuation of application No. PCT/US2022/017245, filed on Feb. 22, 2022.

(30) Foreign Application Priority Data

Mar. 5, 2021 (CN) .......................... 202110244600.2

(51) Int. Cl.
*H01R 13/52* (2006.01)
*H02J 7/00* (2006.01)

(52) U.S. Cl.
CPC .......... *H01R 13/521* (2013.01); *H02J 7/0013* (2013.01); *H02J 7/0045* (2013.01)

(58) Field of Classification Search
CPC ................................................... H01R 13/521
See application file for complete search history.

(56) References Cited

U.S. PATENT DOCUMENTS

| 3,424,334 | A  |   | 1/1969  | Goltz           |
|-----------|----|---|---------|-----------------|
| 5,448,151 | A  |   | 9/1995  | Ganse et al.    |
| 5,890,613 | A  |   | 4/1999  | Williams        |
| 6,412,133 | B1 | * | 7/2002  | Erlich ............... E04H 4/1663 |
|           |    |   |         | 15/1.7          |
| 6,982,541 | B2 |   | 1/2006  | Zick et al.     |
| 6,983,946 | B2 |   | 1/2006  | Sullivan et al. |
| 7,064,519 | B2 |   | 6/2006  | Ito             |
| 7,332,889 | B2 |   | 2/2008  | Glasgow et al.  |
| 7,471,063 | B2 |   | 12/2008 | Zick et al.     |
| 7,557,537 | B2 |   | 7/2009  | Zick et al.     |
| 7,609,027 | B2 |   | 10/2009 | Zick et al.     |

(Continued)

FOREIGN PATENT DOCUMENTS

| CN | 204119137 | 1/2015 |
| CN | 104669226 | 6/2015 |

(Continued)

OTHER PUBLICATIONS

International Search Report and Written Opinion for International Application No. PCT/US2022/017245, dated Jun. 13, 2022, 10 pages.

(Continued)

*Primary Examiner* — Jerry D Robbins
(74) *Attorney, Agent, or Firm* — Reinhart Boerner Van Deuren s.c.

(57) ABSTRACT

A battery charging unit including a battery interface. The battery interface includes a cover that surrounds at least a portion of the battery interface to protect exterior elements from damaging the electrical functionality of the battery interface.

16 Claims, 4 Drawing Sheets

(56) References Cited

U.S. PATENT DOCUMENTS

| | | | |
|---|---|---|---|
| 7,733,054 | B2 | 6/2010 | Phillips et al. |
| 7,771,221 | B1* | 8/2010 | Blackwell ............ H01R 13/52 |
| | | | 439/282 |
| 7,868,590 | B2 | 1/2011 | Zick et al. |
| 8,159,078 | B2 | 4/2012 | Usselman et al. |
| 8,203,307 | B2 | 6/2012 | Zick et al. |
| 8,415,921 | B1 | 4/2013 | Yong et al. |
| 8,415,924 | B2 | 4/2013 | Matthias et al. |
| 8,740,010 | B1 | 6/2014 | Page |
| 8,890,478 | B2 | 11/2014 | Matthias et al. |
| 9,112,356 | B2 | 8/2015 | Cover |
| 9,375,835 | B1 | 6/2016 | Lin |
| 9,381,640 | B2 | 7/2016 | Van Der Linde et al. |
| 9,478,787 | B2* | 10/2016 | Sheen ................. H01M 50/503 |
| 9,634,503 | B2 | 4/2017 | Taga et al. |
| 9,698,621 | B2 | 7/2017 | Usselman et al. |
| 9,728,984 | B2 | 8/2017 | Ogura |
| 9,917,452 | B2 | 3/2018 | Kishima et al. |
| 10,211,488 | B2 | 2/2019 | Willgert et al. |
| 10,293,476 | B2 | 5/2019 | Fleischmann |
| 10,324,133 | B2 | 6/2019 | Zeng |
| 10,574,067 | B1 | 2/2020 | Hanson |
| 10,583,962 | B2 | 3/2020 | Brunner et al. |
| 10,618,692 | B2 | 4/2020 | Hori et al. |
| 10,651,664 | B2 | 5/2020 | Sergyeyenko |
| 10,666,064 | B2* | 5/2020 | Hennesy ............ H02J 7/00712 |
| 10,703,534 | B2 | 7/2020 | Brunner et al. |
| 10,750,833 | B2 | 8/2020 | Burchia |
| 2003/0139080 | A1 | 7/2003 | Lafragette et al. |
| 2005/0083639 | A1 | 4/2005 | Zick et al. |
| 2005/0273325 | A1 | 12/2005 | Frey et al. |
| 2006/0006838 | A1 | 1/2006 | Clarke |
| 2007/0138041 | A1 | 6/2007 | Welsh |
| 2007/0182368 | A1 | 8/2007 | Yang |
| 2008/0100261 | A1 | 5/2008 | Glasgow et al. |
| 2009/0085514 | A1 | 4/2009 | Mizoguchi et al. |
| 2010/0085745 | A1 | 4/2010 | Kristiansen et al. |
| 2010/0176761 | A1 | 7/2010 | Suzuki et al. |
| 2010/0231161 | A1 | 9/2010 | Brown |
| 2010/0264876 | A1 | 10/2010 | Powell et al. |
| 2011/0068742 | A1 | 3/2011 | McCurrry et al. |
| 2011/0260588 | A1 | 10/2011 | Lin |
| 2012/0212175 | A1 | 8/2012 | Sharaf et al. |
| 2013/0048631 | A1 | 2/2013 | Van Der Linde et al. |
| 2013/0051080 | A1 | 2/2013 | Van Der Linde et al. |
| 2013/0058711 | A1 | 3/2013 | Van Der Linde et al. |
| 2013/0127129 | A1 | 5/2013 | Bensman et al. |
| 2013/0134276 | A1 | 5/2013 | Van Der Linde et al. |
| 2013/0176688 | A1 | 7/2013 | Shen et al. |
| 2014/0265440 | A1 | 9/2014 | Chen et al. |
| 2015/0078811 | A1 | 3/2015 | Van Der Linde et al. |
| 2015/0244197 | A1* | 8/2015 | Taga .................... H02J 7/0045 |
| | | | 320/113 |
| 2017/0063114 | A1 | 3/2017 | Briere |
| 2017/0166352 | A1 | 6/2017 | Hoppe et al. |
| 2018/0062145 | A1 | 3/2018 | Yang |
| 2018/0161975 | A1 | 6/2018 | Brunner |
| 2018/0183250 | A1 | 6/2018 | Byrne et al. |
| 2019/0225371 | A1 | 7/2019 | Hoppe et al. |
| 2019/0299438 | A1* | 10/2019 | Erndt ................. B26B 19/3866 |
| 2020/0147781 | A1 | 5/2020 | Squiers et al. |
| 2020/0165036 | A1 | 5/2020 | Squiers et al. |
| 2020/0223585 | A1 | 7/2020 | Brunner et al. |
| 2022/0140523 | A1* | 5/2022 | Tyler .................... H01R 13/41 |
| | | | 439/283 |
| 2023/0122425 | A1 | 4/2023 | Camp et al. |

FOREIGN PATENT DOCUMENTS

| | | |
|---|---|---|
| CN | 205480493 | 8/2016 |
| CN | 206211558 | 5/2017 |
| CN | 206313514 | 7/2017 |
| CN | 206465063 | 9/2017 |
| CN | 108462237 | 8/2018 |
| CN | 208149497 | 11/2018 |
| CN | 208226628 | 12/2018 |
| CN | 208226647 | 12/2018 |
| CN | 109617218 | 4/2019 |
| CN | 208697388 | 4/2019 |
| CN | 209860630 | 12/2019 |
| CN | 210092940 | 2/2020 |
| CN | 210436119 | 5/2020 |
| DE | 102008052158 | 4/2010 |
| DE | 102012213047 | 1/2014 |
| DE | 202014103695 | 10/2014 |
| DE | 102017211006 | 1/2019 |
| DE | 102018102982 | 8/2019 |
| EP | 0716495 | 6/1996 |
| EP | 1724069 A2 | 11/2006 |
| EP | 2537641 B1 | 9/2016 |
| EP | 2338650 B1 | 10/2016 |
| GB | 2211486 | 7/1989 |
| JP | 2020-124781 | 8/2020 |
| KR | 10-2000- 0073212 | 12/2000 |
| WO | WO9839831 | 9/1998 |
| WO | WO11151110 | 12/2011 |
| WO | WO14070858 | 5/2014 |
| WO | WO2014/125484 | 8/2014 |
| WO | WO2021034658 | 2/2021 |

OTHER PUBLICATIONS

Inter Partes Review No. 2024-01400, "Petition for Inter Partes Review of U.S. Pat. No. 11,365,026" Filed Sep. 17, 2024, 147 pages.
Exhibit 1001 in Petition for Inter Partes Review of U.S. Pat. No. 11,365,026 Filed Sep. 17, 2024, 66 pages.
Exhibit 1002 in Petition for Inter Partes Review of U.S. Pat. No. 11,365,026 Filed Sep. 17, 2024, 324 pages.
Exhibit 1003 in Petition for Inter Partes Review of U.S. Pat. No. 11,365,026 Filed Sep. 17, 2024, 139 pages.
Exhibit 1004 in Petition for Inter Partes Review of U.S. Pat. No. 11,365,026 Filed Sep. 17, 2024, 17 pages.
Exhibit 1005 in Petition for Inter Partes Review of U.S. Pat. No. 11,365,026 Filed Sep. 17, 2024, 9 pages.
Exhibit 1007 in Petition for Inter Partes Review of U.S. Pat. No. 11,365,026 Filed Sep. 17, 2024, 16 pages.
Exhibit 1008 in Petition for Inter Partes Review of U.S. Pat. No. 11,365,026 Filed Sep. 17, 2024, 31 pages.
Exhibit 1009 in Petition for Inter Partes Review of U.S. Pat. No. 11,365,026 Filed Sep. 17, 2024, 6 pages.
Exhibit 1010 in Petition for Inter Partes Review of U.S. Pat. No. 11,365,026 Filed Sep. 17, 2024, 4 pages.
Exhibit 1011 in Petition for Inter Partes Review of U.S. Pat. No. 11,365,026 Filed Sep. 17, 2024, 16 pages.
Exhibit 1012 in Petition for Inter Partes Review of U.S. Pat. No. 11,365,026 Filed Sep. 17, 2024, 8 pages.
Exhibit 1013 in Petition for Inter Partes Review of U.S. Pat. No. 11,365,026 Filed Sep. 17, 2024, 19 pages.
Exhibit 1015 in Petition for Inter Partes Review of U.S. Pat. No. 11,365,026 Filed Sep. 17, 2024, 11 pages.
Exhibit 1016 in Petition for Inter Partes Review of U.S. Pat. No. 11,365,026 Filed Sep. 17, 2024, 193 pages.
Exhibit 1017 in Petition for Inter Partes Review of U.S. Pat. No. 11,365,026 Filed Sep. 17, 2024, 29 pages.
Exhibit 1018 in Petition for Inter Partes Review of U.S. Pat. No. 11,365,026 Filed Sep. 17, 2024, 15 pages.
Exhibit 1021 in Petition for Inter Partes Review of U.S. Pat. No. 11,365,026 Filed Sep. 17, 2024, 313 pages.
Exhibit 1030 in Petition for Inter Partes Review of U.S. Pat. No. 11,365,026 Filed Sep. 17, 2024, 95 pages.
Exhibit 1031 in Petition for Inter Partes Review of U.S. Pat. No. 11,365,026 Filed Sep. 17, 2024, 5 pages.
Exhibit 1032 in Petition for Inter Partes Review of U.S. Pat. No. 11,365,026 Filed Sep. 17, 2024, 19 pages.
Inter Partes Review No. 2024-01401, "Petition for Inter Partes Review of U.S. Pat. No. 11,794,952" Filed Sep. 17, 2024, 165 pages.

(56) References Cited

OTHER PUBLICATIONS

Exhibit 1001 in Petition for Inter Partes Review of U.S. Pat. No. 11,794,952 Filed Sep. 17, 2024, 67 pages.
Exhibit 1002 Part 1 in Petition for Inter Partes Review of U.S. Pat. No. 11,794,952 Filed Sep. 17, 2024, 227 pages.
Exhibit 1002 Part 2 in Petition for Inter Partes Review of U.S. Pat. No. 11,794,952 Filed Sep. 17, 2024, 278 pages.
Exhibit 1003 in Petition for Inter Partes Review of U.S. Pat. No. 11,794,952 Filed Sep. 17, 2024, 168 pages.
Exhibit 1004 in Petition for Inter Partes Review of U.S. Pat. No. 11,794,952 Filed Sep. 17, 2024, 17 pages.
Exhibit 1005 in Petition for Inter Partes Review of U.S. Pat. No. 11,794,952 Filed Sep. 17, 2024, 9 pages.
Exhibit 1007 in Petition for Inter Partes Review of U.S. Pat. No. 11,794,952 Filed Sep. 17, 2024, 16 pages.
Exhibit 1008 in Petition for Inter Partes Review of U.S. Pat. No. 11,794,952 Filed Sep. 17, 2024, 31 pages.
Exhibit 1009 in Petition for Inter Partes Review of U.S. Pat. No. 11,794,952 Filed Sep. 17, 2024, 6 pages.
Exhibit 1010 in Petition for Inter Partes Review of U.S. Pat. No. 11,794,952 Filed Sep. 17, 2024, 4 pages.
Exhibit 1011 in Petition for Inter Partes Review of U.S. Pat. No. 11,794,952 Filed Sep. 17, 2024, 16 pages.
Exhibit 1012 in Petition for Inter Partes Review of U.S. Pat. No. 11,794,952 Filed Sep. 17, 2024, 8 pages.
Exhibit 1013 in Petition for Inter Partes Review of U.S. Pat. No. 11,794,952 Filed Sep. 17, 2024, 19 pages.
Exhibit 1015 in Petition for Inter Partes Review of U.S. Pat. No. 11,794,952 Filed Sep. 17, 2024, 11 pages.
Exhibit 1016 in Petition for Inter Partes Review of U.S. Pat. No. 11,794,952 Filed Sep. 17, 2024, 193 pages.
Exhibit 1017 in Petition for Inter Partes Review of US Pat. No. 11,794, 952 Filed Sep. 17, 2024, 29 pages.
Exhibit 1018 in Petition for Inter Partes Review of U.S. Pat. No. 11,794,952 Filed Sep. 17, 2024, 15 pages.
Exhibit 1021 in Petition for Inter Partes Review of U.S. Pat. No. 11,794,952 Filed Sep. 17, 2024, 313 pages.
Exhibit 1022 in Petition for Inter Partes Review of U.S. Pat. No. 11,794,952 Filed Sep. 17, 2024, 324 pages.
Exhibit 1023 in Petition for Inter Partes Review of U.S. Pat. No. 11,794,952 Filed Sep. 17, 2024, 5 pages.
Exhibit 1024 in Petition for Inter Partes Review of US Pat. No. 11,794, 952 Filed Sep. 17, 2024, 7 pages.
Exhibit 1027 in Petition for Inter Partes Review of U.S. Pat. No. 11,794,952 Filed Sep. 17, 2024, 7 pages.
Exhibit 1030 in Petition for Inter Partes Review of U.S. Pat. No. 11,794,952 Filed Sep. 17, 2024, 95 pages.
Exhibit 1031 in Petition for Inter Partes Review of US Pat. No. 11,794, 952 Filed Sep. 17, 2024, 5 pages.
Exhibit 1032 in Petition for Inter Partes Review of U.S. Pat. No. 11,794,952 Filed Sep. 17, 2024, 60 pages.

\* cited by examiner

POWER TOOL BATTERY CHARGER

CROSS-REFERENCE TO RELATED PATENT APPLICATION

The present application is a continuation of International Application No. PCT/US2022/017245, filed Feb. 22, 2022, which claims the benefit of and priority to Chinese Application No. 202110244600.2, filed on Mar. 5, 2021, which are incorporated herein by reference in their entireties.

BACKGROUND OF THE INVENTION

The present disclosure is directed generally to battery chargers. The present disclosure relates specifically to a battery charging unit for power tools.

Battery chargers for power tools include one or more battery interfaces. The battery interface includes an exterior interface and an electrical element, such as a wire, extending from the battery interface. The exterior interface couples with the battery being recharged, and the wire electrically couples a power input to the exterior interface. In various embodiments, the battery charging unit includes coupling elements to couple the battery charging unit within a modular storage system.

SUMMARY OF THE INVENTION

One embodiment of the invention relates to battery charging unit including a housing, a power input configured to receive electrical power, and a battery interface electrically coupled to the power input. The battery interface is configured to recharge a rechargeable power tool battery with power received from the power input. The battery interface includes an exterior interface configured to couple with the rechargeable power tool battery, circuitry electrically coupling the power input to the exterior interface via an electrical connection, and a water-blocking shell coupled to the housing, the water-blocking shell surrounding the electrical connection between the circuitry and the exterior interface such that a water-tight seal is formed around the electrical connection.

Another embodiment of the invention relates to a battery charging unit including a housing, a power source, and a battery interface. The battery interface is electrically coupled to the power source. The battery interface is configured to recharge a rechargeable power tool battery with power received from the power source. The battery interface includes an exterior interface configured to couple with the rechargeable power tool battery, circuitry electrically coupling the power source to the exterior interface via an electrical connection, a sleeve that circumferentially surrounds the circuitry, and a seal coupled to the housing and the sleeve. The seal surrounds the electrical connection between the circuitry and the exterior interface such that a water-tight seal is formed around the electrical connection.

Another embodiment of the invention relates to a battery charging unit including a housing, a power input configured to receive electrical power, and a battery interface. The battery interface is electrically coupled to the power input. The battery interface is configured to recharge a rechargeable power tool battery with power received from the power input. The battery interface includes an exterior interface configured to couple with the rechargeable power tool battery, circuitry electrically coupling the power input to the exterior interface via an electrical connection, and a seal coupled to the housing. The seal surrounds the electrical connection between the circuitry and the exterior interface such that a water-tight seal is formed around the electrical connection.

Another embodiment of the invention relates to a battery charging unit including a housing, a coupling element configured to couple the housing to a modular system, a power input configured to receive electrical power, and a battery interface. The battery interface is electrically coupled to the power input. The battery interface is configured to recharge a rechargeable power tool battery with power received from the power input. The battery interface includes an exterior interface configured to couple with the rechargeable power tool battery, circuitry electrically coupling the power input to the exterior interface via an electrical connection, and a seal coupled to the housing. The seal surrounds the electrical connection between the circuitry and the exterior interface such that a water-tight seal is formed around the electrical connection.

Additional features and advantages will be set forth in the detailed description which follows, and, in part, will be readily apparent to those skilled in the art from the description or recognized by practicing the embodiments as described in the written description included, as well as the appended drawings. It is to be understood that both the foregoing general description and the following detailed description are exemplary.

The accompanying drawings are included to provide further understanding and are incorporated in and constitute a part of this specification. The drawings illustrate one or more embodiments and, together with the description, serve to explain principles and operation of the various embodiments.

BRIEF DESCRIPTION OF THE DRAWINGS

This application will become more fully understood from the following detailed description, taken in conjunction with the accompanying figures, wherein like reference numerals refer to like elements in which.

DETAILED DESCRIPTION

Referring generally to the figures, an embodiment of a battery charging unit for power tool batteries is shown. Some power tools use batteries that can be removed from the power tool. A battery charging unit is used to recharge a rechargeable power tool battery for a power tool. At some worksites the battery charging unit is exposed to the elements, such as rain. If permitted to enter the housing of the battery charging unit, water, such as rain water, may damage the electrical system, particularly at non-water-blocked electrical connections. Provided herein is an innovative structure to protect one or more electrical connections in the battery charging unit from the damaging effects of water or other contaminants entering the housing. In specific embodiments discussed herein, a single molded polymer shell is formed coupled to the battery terminals and encapsulating the electrical connection points between the power input and the terminals. Applicant believes that such an arrangement provides robust water-blocking performance while also benefiting from the efficiency of molding techniques, at least in some embodiments. This is in contrast to at least some water-blocking techniques such as water-proof exterior housing or individual encapsulation of electrical connections in polymer material.

Figure 1:
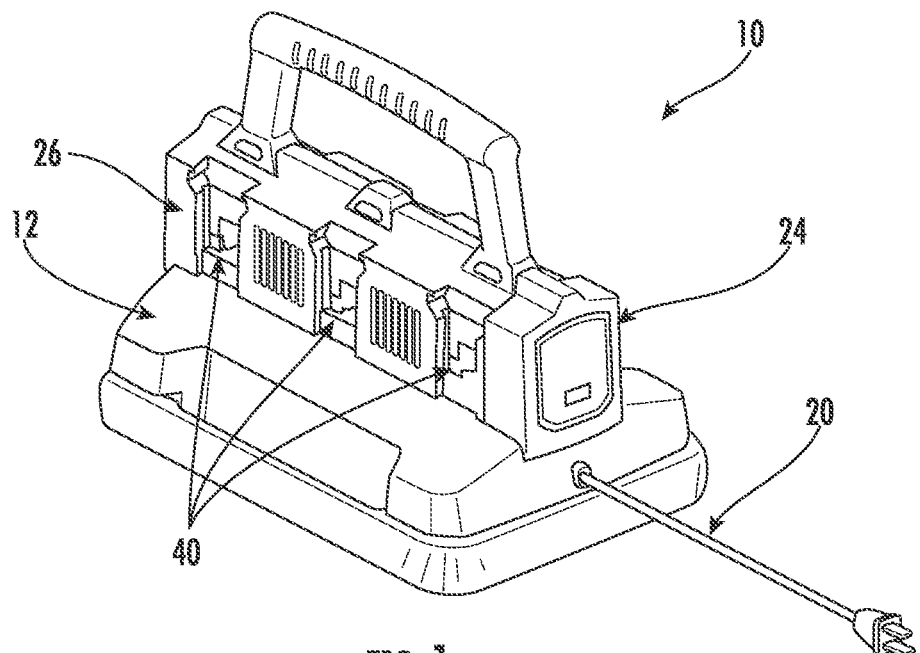
FIG. 1 is a front perspective view from above of a battery charging unit, according to an exemplary embodiment.
Figure 2:
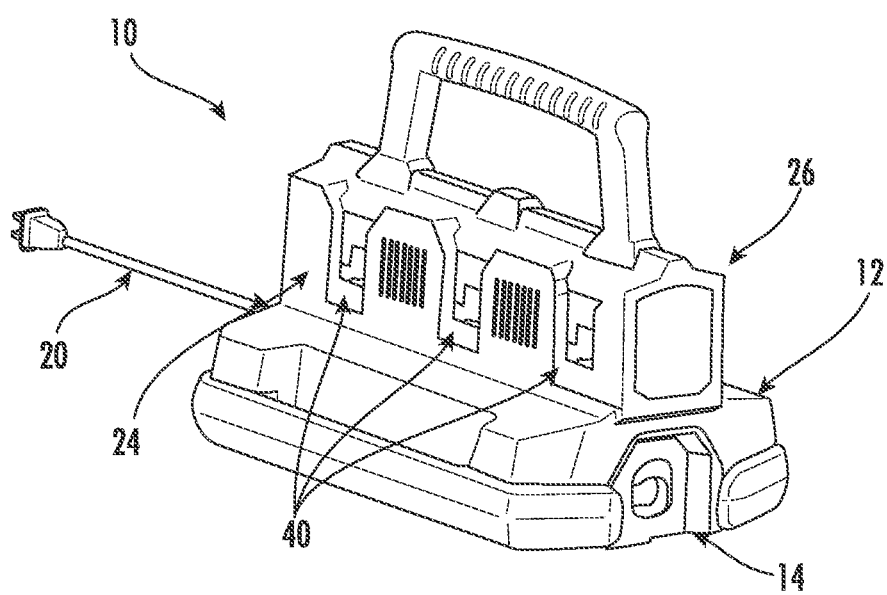
FIG. 2 is a rear perspective view from above of the battery charging unit of FIG. 1, according to an exemplary embodiment.
Figure 3:
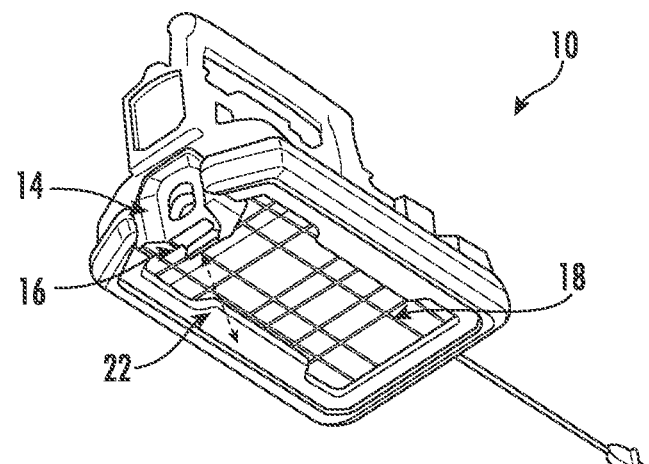
FIG. 3 is a perspective view from below of the battery charging unit of FIG. 1, according to an exemplary embodiment.

Referring to FIGS. 1-3, a unit and/or device, shown as battery charging unit 10 is shown according to an exemplary embodiment. A power source and/or device configured to receive electrical power, shown as power input 20, extends from battery charging unit 10. In a specific embodiment, power input 20 is a plug configured to interface with a wall outlet.

Battery charging unit 10 includes one or more devices for charging rechargeable power tool batteries, shown as battery interface 40. Battery interface 40 is physically coupled to housing 12 and electrically coupled to power input 20. In a specific embodiment, battery interface 40 is configured to physically couple with a rechargeable power tool battery and thereafter electrically recharge the rechargeable power tool battery with power received from power input 20. In various embodiments, a first side 24 of housing 12 includes a plurality of battery interfaces 40, and second side 26 of housing 12 opposite first side 24 includes a plurality of battery interfaces 40. In a specific embodiment, a first side 24 of housing 12 includes three battery interfaces 40 and second side 26 of housing 12 opposite first side 24 includes three battery interfaces 40.

A structure for coupling battery charging unit 10 to containers, units and/or devices, shown as coupling element 14, is shown. Coupling element 14 includes a protrusion 16 that linearly actuates along axis 22.

Figure 4:
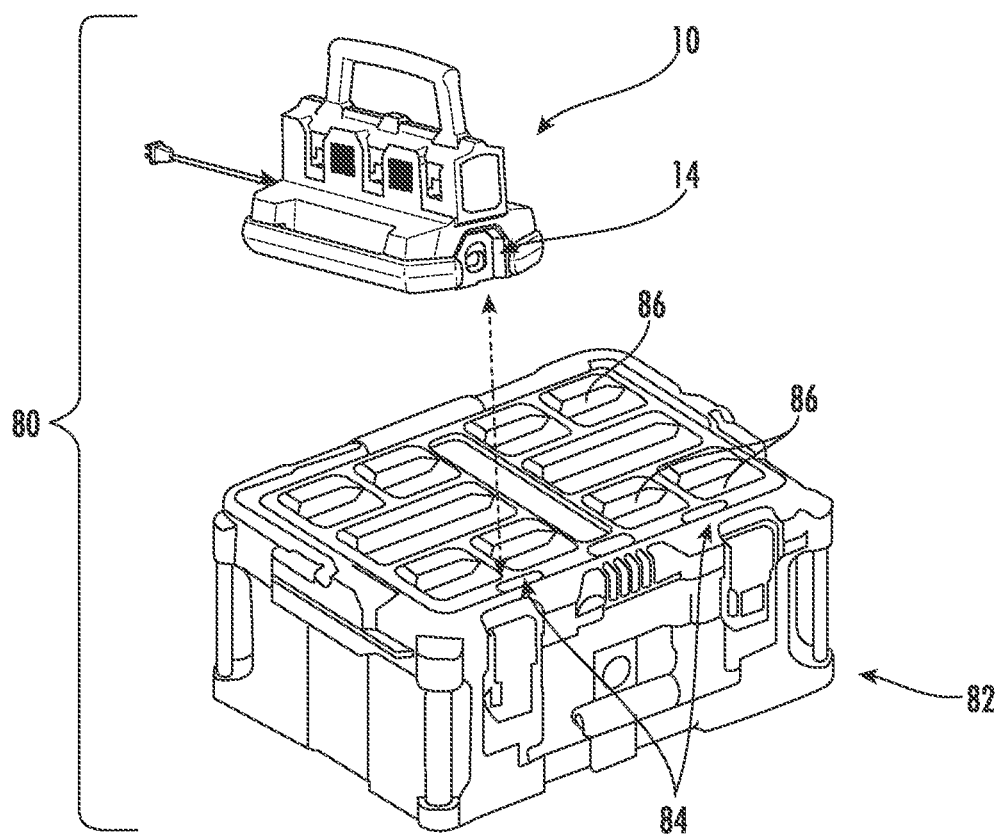
FIG. 4 is a modular system including the battery charging unit of FIG. 1, according to an exemplary embodiment.

Referring to FIG. 4, a modular system, shown as modular storage system 80, includes battery charging unit 10 and modular storage unit 82 is shown according to an exemplary embodiment. In a specific embodiment, coupling element 14 is configured to engage with aperture 84 and/or bottom surface 18 of battery charging unit 10 is configured to engage with the coupling mechanism 86 of modular storage unit 82. In a specific embodiment, coupling element 14 is configured to couple housing 12 to modular storage system 80. In a specific embodiment, coupling element 14 and/or bottom surface 18 of battery charging unit 10 is compatible with the coupling mechanism(s) described in International Patent Application No. PCT/US2018/044629, which is incorporated herein by reference and as a result battery charging unit 10 is configured to couple to a modular storage system 80.

Figure 5:
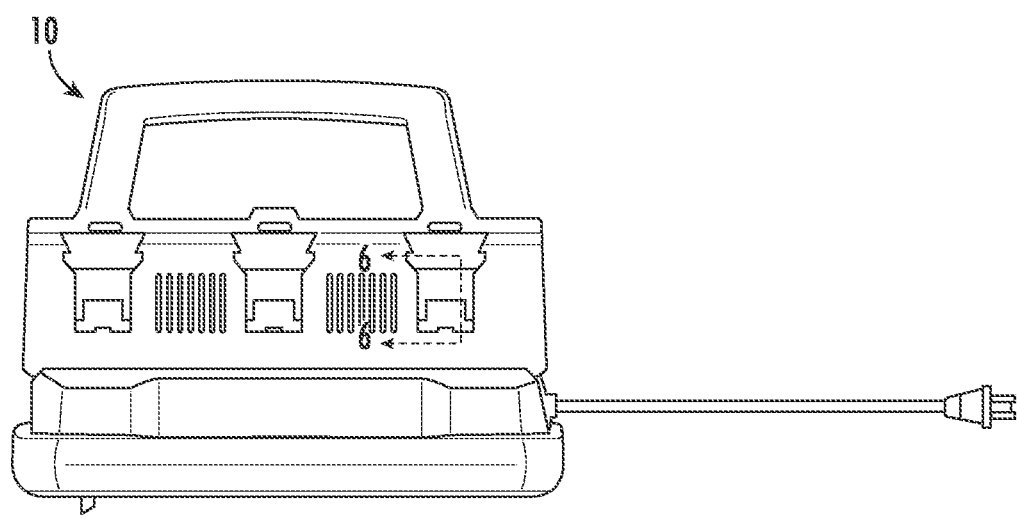
FIG. 5 is a side view of a portion of the battery charging unit of FIG. 1 including a battery interface, according to an exemplary embodiment.
Figure 6:
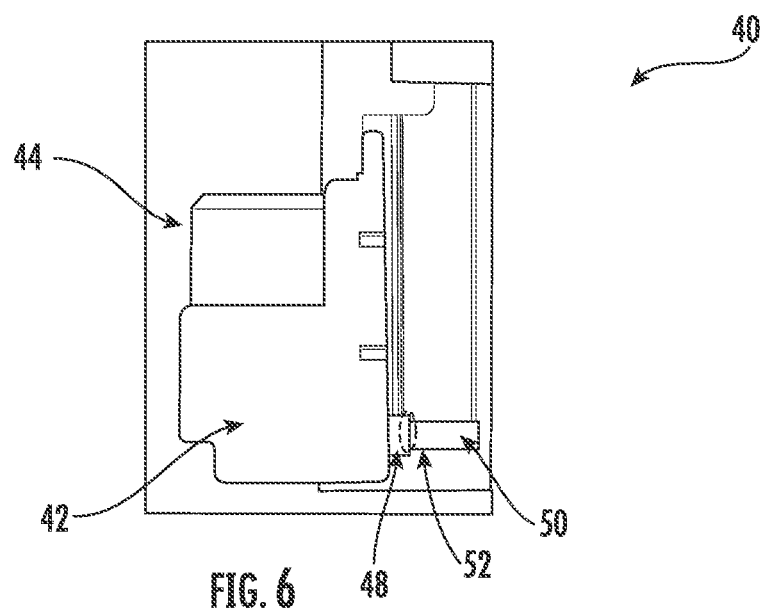
FIG. 6 is a cross-section view of a portion of the battery charging unit of FIG. 1 taken along line 6-6 in FIG. 5, according to an exemplary embodiment.
Figure 7:
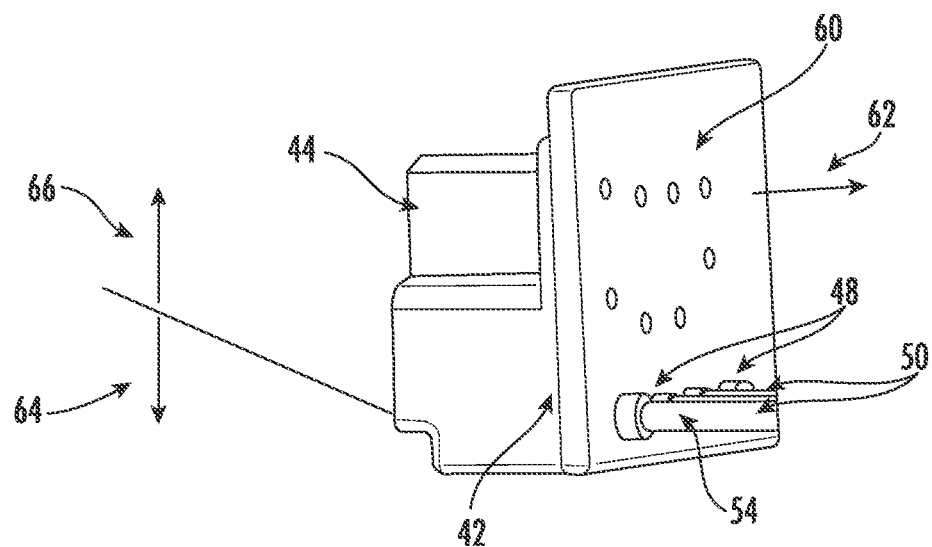
FIG. 7 is a perspective view of the battery interface of FIG. 6, according to an exemplary embodiment.

Referring to FIGS. 5-7, battery interface 40 includes one or more battery contacts, shown as exterior interface 44, for recharging power tool batteries. Exterior interface 44 is configured to couple with a rechargeable power tool battery. Exterior interface 44 is coupled to and extends from body 42 of battery interface 40. When a rechargeable power tool battery is coupled to battery interface 40, exterior interface 44 is electrically coupled to the rechargeable power tool battery.

An electrical element and/or circuitry, shown as wire 50, is coupled to body 42 of battery interface 40. Wire 50 electrically couples power input 20 to exterior interface 44 via electrical connection 52. Wire 50 receives power from power input 20 and provides the received power to exterior interface 44. In a specific embodiment, sleeve 54 circumferentially surrounds wire 50.

Wire 50 is electrically coupled to exterior interface 44 via electrical connection 52. A seal and/or liquid-blocking shell, such as a water-blocking shell, shown as cover 48, is coupled to housing 12. In a specific embodiment, cover 48 is coupled to housing 12 and sleeve 54. Cover 48 surrounds at least a portion of electrical connection 52. In a specific embodiment, cover 48 and body 42 are collectively formed as a single component, such as a single, integral, continuous piece of polymer material. In another embodiment, cover 48 and body 42 are formed separately and adhere to each other to form a water-tight seal.

In general, cover 48 surrounds electrical connection 52 between wire 50 and exterior interface 44 such that a water-tight seal is formed around electrical connection 52. In this manner, battery terminal 40 utilizes a cover 48 to block water from causing us short at electrical connection 52.

In a specific embodiment, cover 48 includes a polymer material that surrounds electrical connection 52. In a specific embodiment, cover 48 includes a single, integral, continuous piece of polymer material molded around electrical connection 52. In a specific embodiment, the single, integral, continuous piece of polymer material is coupled to the exterior interface 44 and to the housing 12, such as by exterior interface 44 extending downward through body 42 of battery interface 40 and cover 48 being coupled to a lower portion of exterior interface 44.

In a specific embodiment, cover 48 is formed around electrical connection 52 such as by being molded and/or insert molded into an insert molded terminal block. In an alternative embodiment, cover 48 is formed from two or more structures, such as two or more polymer structures that are coupled together.

In a specific embodiment, battery charging unit 10 includes a plurality of electrical connections 52 between power input 20 and exterior interface 44 of battery interface 40. In a specific embodiment, a single, integral, continuous piece of polymer material is molded around each of the plurality of electrical connections 52 forming water-tight seals around all of the plurality of electrical connections 52.

Battery interface 40 includes slide pin interface 60 that interfaces with one or more elements, such as slide pins, in direction 62 (FIG. 7). In a specific embodiment, slide pin interface 60 is used to facilitate cover 48 being formed (e.g., molded) around electrical connections 52. In a specific embodiment, cavity 64 is provided at a lower portion of battery interface 40 and core 66 is an upper portion of battery interface 40 from the perspective of FIG.

In an exemplary method of manufacturing battery charging unit, wire 50 with sleeve 54 is inserted into body 42. A polymer material, such as cover 48, is then molded over sleeve 54 thereby forming a water-tight and/or water-blocking seal.

It should be understood that the figures illustrate the exemplary embodiments in detail, and it should be understood that the present application is not limited to the details or methodology set forth in the description or illustrated in the figures. It should also be understood that the terminology is for description purposes only and should not be regarded as limiting.

Further modifications and alternative embodiments of various aspects of the disclosure will be apparent to those skilled in the art in view of this description. Accordingly, this description is to be construed as illustrative only. The construction and arrangements, shown in the various exemplary embodiments, are illustrative only. Although only a few embodiments have been described in detail in this disclosure, many modifications are possible (e.g., variations in sizes, dimensions, structures, shapes and proportions of the various elements, values of parameters, mounting arrangements, use of materials, colors, orientations, etc.) without materially departing from the novel teachings and advantages of the subject matter described herein. Some elements shown as integrally formed may be constructed of multiple parts or elements, the position of elements may be reversed or otherwise varied, and the nature or number of discrete elements or positions may be altered or varied. The order or sequence of any process, logical algorithm, or method steps may be varied or re-sequenced according to alternative embodiments. Other substitutions, modifications, changes and omissions may also be made in the design, operating conditions and arrangement of the various exemplary embodiments without departing from the scope of the present disclosure.

Unless otherwise expressly stated, it is in no way intended that any method set forth herein be construed as requiring that its steps be performed in a specific order. Accordingly, where a method claim does not actually recite an order to be followed by its steps or it is not otherwise specifically stated in the claims or descriptions that the steps are to be limited to a specific order, it is in no way intended that any particular order be inferred. In addition, as used herein, the article "a" is intended to include one or more component or element, and is not intended to be construed as meaning only one. As used herein, "rigidly coupled" refers to two components being coupled in a manner such that the components move together in a fixed positional relationship when acted upon by a force.

Various embodiments of the disclosure relate to any combination of any of the features, and any such combination of features may be claimed in this or future applications. Any of the features, elements or components of any of the exemplary embodiments discussed above may be utilized alone or in combination with any of the features, elements or components of any of the other embodiments discussed above.

For purposes of this disclosure, the term "coupled" means the joining of two components directly or indirectly to one another. Such joining may be stationary in nature or movable in nature. Such joining may be achieved with the two members and any additional intermediate members being integrally formed as a single unitary body with one another or with the two members or the two members and any additional member being attached to one another. Such joining may be permanent in nature or alternatively may be removable or releasable in nature.

While the current application recites particular combinations of features in the claims appended hereto, various embodiments of the invention relate to any combination of any of the features described herein whether or not such combination is currently claimed, and any such combination of features may be claimed in this or future applications. Any of the features, elements, or components of any of the exemplary embodiments discussed above may be used alone or in combination with any of the features, elements, or components of any of the other embodiments discussed above.

What is claimed is:

1. A battery charging unit comprising:
    a housing;
    a power source;
    a battery interface electrically coupled to the power source, the battery interface configured to recharge a rechargeable power tool battery with power received from the power source, the battery interface comprising:
        an exterior interface configured to couple with the rechargeable power tool battery;
        circuitry electrically coupling the power source to the exterior interface via an electrical connection;
        a sleeve that circumferentially surrounds the circuitry; and
        a seal coupled to the housing and the sleeve, the seal surrounding the electrical connection between the circuitry and the exterior interface such that a water-tight seal is formed around the electrical connection; and
    a plurality of electrical connections between the power source and the exterior interface of the battery interface, wherein the seal is molded around each of the plurality of electrical connections forming water-tight seals around all of the plurality of electrical connections.

2. The battery charging unit of claim 1, wherein the power source comprises a power input configured to interface with a wall outlet.

3. The battery charging unit of claim 1, the seal comprises a polymer material that surrounds the electrical connection.

4. The battery charging unit of claim 1, comprising a coupling element configured to couple the housing to a modular system.

5. The battery charging unit of claim 4, wherein the coupling element linearly actuates a protrusion along an axis.

6. The battery charging unit of claim 1, comprising a plurality of battery interfaces, each of which are electrically coupled to the power source, the battery interface configured to recharge a rechargeable power tool battery with power received from the power source.

7. A battery charging unit comprising:
    a housing;
    a power input configured to receive electrical power;
    a battery interface electrically coupled to the power input, the battery interface configured to recharge a rechargeable power tool battery with power received from the power input, the battery interface comprising:
        an exterior interface configured to couple with the rechargeable power tool battery;
        circuitry electrically coupling the power input to the exterior interface via an electrical connection; and
        a seal coupled to the housing, the seal surrounding the electrical connection between the circuitry and the exterior interface such that a water-tight seal is formed around the electrical connection; and
    a plurality of electrical connections between the power input and the exterior interface of the battery interface, wherein the single, integral, continuous piece of polymer material is molded around each of the plurality of electrical connections forming water-tight seals around all of the plurality of electrical connections.

8. The battery charging unit of claim 7, the seal comprises a polymer material that surrounds the electrical connection.

9. The battery charging unit of claim 7, the seal comprises a single, integral, continuous piece of polymer material molded around the electrical connection.

10. The battery charging unit of claim 7, wherein the single, integral, continuous piece of polymer material is coupled to the exterior interface and to the housing.

11. The battery charging unit of claim 7, comprising a coupling element that linearly actuates a protrusion along an axis, the coupling element configured to couple the housing to a modular system.

12. A battery charging unit comprising:
a housing;
a coupling element configured to couple the housing to a modular system;
a power input configured to receive electrical power; and
a battery interface electrically coupled to the power input, the battery interface configured to recharge a rechargeable power tool battery with power received from the power input, the battery interface comprising:
an exterior interface configured to couple with the rechargeable power tool battery;
circuitry electrically coupling the power input to the exterior interface via an electrical connection; and
a seal coupled to the housing, the seal surrounding the electrical connection between the circuitry and the exterior interface such that a water-tight seal is formed around the electrical connection; and
a plurality of electrical connections between the power input and the exterior interface of the battery interface, wherein the seal is molded around each of the plurality of electrical connections forming water-tight seals around all of the plurality of electrical connections.

13. The battery charging unit of claim 12, comprising a sleeve that circumferentially surrounds the circuitry, wherein the seal is coupled to the sleeve.

14. The battery charging unit of claim 12, the seal comprises a polymer material that surrounds the electrical connection.

15. The battery charging unit of claim 12, the seal comprises a single, integral, continuous piece of polymer material molded around the electrical connection.

16. The battery charging unit of claim 12, wherein the coupling element linearly actuates a protrusion along an axis.

* * * * *